(12) United States Patent
Buryak

(10) Patent No.: US 8,194,320 B2
(45) Date of Patent: Jun. 5, 2012

(54) METHOD FOR DESIGNING OPTIMIZED MULTI-CHANNEL GRATING STRUCTURES

(75) Inventor: Alexander Buryak, Killara (AU)

(73) Assignee: Redfern Optical Components Pty Ltd., Eveleigh, New South Wales (AU)

( * ) Notice: Subject to any disclaimer, the term of this patent is extended or adjusted under 35 U.S.C. 154(b) by 0 days.

(21) Appl. No.: 12/298,518

(22) PCT Filed: Apr. 24, 2007

(86) PCT No.: PCT/AU2007/000528
§ 371 (c)(1),
(2), (4) Date: Apr. 2, 2009

(87) PCT Pub. No.: WO2007/121528
PCT Pub. Date: Nov. 1, 2007

(65) Prior Publication Data
US 2010/0008625 A1 Jan. 14, 2010

(30) Foreign Application Priority Data

Apr. 24, 2006 (AU) ................................ 2006902122

(51) Int. Cl.
*G02B 5/18* (2006.01)
(52) U.S. Cl. .......................... 359/569; 359/575; 385/37
(58) Field of Classification Search .......... 359/569–576; 385/37
See application file for complete search history.

(56) References Cited

U.S. PATENT DOCUMENTS

| 5,600,486 | A | * | 2/1997 | Gal et al. | 359/569 |
| 6,345,135 | B1 |   | 2/2002 | Reid et al. | |
| 6,445,852 | B1 |   | 9/2002 | Feced et al. | |
| 6,788,849 | B1 | * | 9/2004 | Pawluczyk | 385/37 |

(Continued)

FOREIGN PATENT DOCUMENTS

CA 2465168 10/2004

(Continued)

OTHER PUBLICATIONS

Buryak, Alexander V., et al., "Novel multi-channel grating designs", Proceedings of Bragg Gratings, Photosensitivity and Polling in Glass Waveguides, vol. 60 of Top Series, OSA, Washington, D.C., Peper BTHB3, (2001), pp. 1-3.*

(Continued)

Primary Examiner — Frank Font
(74) Attorney, Agent, or Firm — SNR Denton US LLP

(57) ABSTRACT

A method is described for designing a multi-channel grating structure having at least one specified spectral characteristic in a photosensitive material, the multi-channel grating structure having at least one free spectral characteristic which is not a specified spectral characteristic. An initial value is provided for each free spectral characteristic, and an initial multi-channel grating function is provided that describes an initial multi-channel grating structure by applying a spectral to spatial domain algorithm to the specified predetermined spectral characteristic using the initial value. A target multi-channel grating function is provided which describes a target multi-channel grating structure in the photosensitive material and an updated value is determined for each initial value with reference to the spectral characteristics of the target multi-channel grating function. An updated multi-channel grating function is derived which describes an updated multi-channel grating structure in the photosensitive material by applying a spectral to spatial domain algorithm to the predetermined spectral characteristic using the at least one updated value. After at least one iteration, the updated multi-channel grating function is output to describe the multi-channel grating structure.

32 Claims, 8 Drawing Sheets

U.S. PATENT DOCUMENTS

| | | | |
|---|---|---|---|
| 7,181,103 B1 * | 2/2007 | Greiner et al. | 385/24 |
| 7,286,732 B2 * | 10/2007 | Greiner et al. | 385/37 |
| 7,352,931 B1 * | 4/2008 | Painchaud et al. | 385/37 |
| 2002/0154410 A1 | 10/2002 | Levner et al. | |
| 2003/0086646 A1 | 5/2003 | Rothenberg et al. | |
| 2003/0138206 A1 | 7/2003 | Sheng et al. | |
| 2004/0037505 A1 * | 2/2004 | Morin | 385/37 |
| 2006/0034568 A1 * | 2/2006 | Martinez | 385/37 |

FOREIGN PATENT DOCUMENTS

| | | |
|---|---|---|
| WO | WO 02/075408 | 9/2002 |
| WO | WO 2004/011988 | 2/2004 |

OTHER PUBLICATIONS

Buryak, Alexander V., et al., "Optimization of refractive index sampling for multichannel fiber Bragg gratings", IEEE Journal of Quantum Electronics, 39(1), Jan. 2003, pp. 91-98.*

Baskar, A, et al., "Design of Optimal Length Low-Dispersion FBG Filter Using Covariance Matrix Adapted Evolution", IEEE Photonics Technology Letters, vol. 17, No. 10, 2005, pp. 2119-2121.

Kolossovski, K. et al. "Three-step design optimization for multlchannel Fiber Bragg gratings", Optics Express, vol. 11, No. 9. . 2003. pp. 1029-1038.

Li, Hongpu et al., "Direct Design of Multichannel Fiber Bragg Grating With Discrete Layer-Peeling Algorithm, I", IEEE Phototonics Technology Letters, vol. 15, No. 9, Sep. 2003, pp. 1262-1254.

Ozcan, et al. "A New Iterative Technique to Characterize and Design Transmisson Fiber Bragg Gratings," Journal of Lightwave Technology, vol. 24, No, 4. Apr. 2006, pp. 1913-1921.

Wu, et al., "New Sampling-Based Design of Simultaneous Compensation of Both Dispersion and Dispersion Slope for Multichannel Fiber Braggs Gratings," IEEE Phototonics Technology Letters, vol. 17, No. 2, Feb. 2005, pp. 361-383.

* cited by examiner

METHOD FOR DESIGNING OPTIMIZED MULTI-CHANNEL GRATING STRUCTURES

CROSS-REFERENCE TO OTHER APPLICATIONS

This is a National Phase of International Application No. PCT/AU2007/000528, filed on Apr. 24, 2007, which claims priority from Australian Patent Application No. 2006902122, filed on Apr. 24, 2006.

FIELD OF THE INVENTION

The present invention relates broadly to methods for designing multi-channel grating structures in waveguides and to multi-channel grating structures in waveguides.

BACKGROUND OF THE INVENTION

Multi-channel grating structures are typically written into photosensitive waveguides. A typical multi-channel grating structure comprises variations in the refractive index of the photosensitive waveguide over the dimensions of the photosensitive waveguide. The refractive index variations are induced by exposing the waveguide to an appropriate pattern of radiation, such as UV light.

Various applications for waveguides require multi-channel grating structures with different spectral characteristics, such as reflection, transmission and group delay characteristics. The profile of refractive index variation over the dimensions of the waveguide determines the optical characteristics of the multi-channel grating structure. A design process is used to analytically or numerically obtain a profile of refractive index variation which, when written to a photosensitive waveguide, results in a grating structure with the desired spectral characteristics.

The materials used to produce photosensitive waveguides are capable of only a limited maximum photo-induced refractive index change. As a result, when designing a multi-channel grating structure, a challenge is to develop a multi-channel grating structure that, on one hand, satisfies the desired spectral characteristics and, on the other hand, has as small as practically possible peak of the refractive index variation (apodisation profile).

One approach to designing multi-channel grating structures is to use periodic sampling. The periodic sampling design method involves the periodic sampling of a single grating structure to produce a multi-channel grating structure. The sampling process involves periodic modulation of the amplitude and/or phase of the single-channel grating structure in the spatial domain and is analogous to the repeat superposition of grating structures. The periodic sampling method produces a resulting refractive index profile which is inherently periodic in its lower frequency component.

Periodic sampling allows the maximum refractive index change required for the grating to be reduced in comparison to non-optimised designs. Despite this, periodic sampling has several disadvantages. The periodic sampling design method yields a grating structure with spectral characteristics that are only approximately close to the desired multi-channel spectral characteristics. Depending on the particular multi-channel grating being designed, there may be significant deviations from the desired multi-channel spectral characteristics. Furthermore, periodic sampling cannot be used to directly design multi-channel gratings with non-identical group delay characteristics.

More recently, the design of multi-channel grating structures by dephasing reflection spectra in the spectral domain has been proposed. Using this design method, the desired reflection spectrum is described as a number of partial reflective spectra. The partial single spectra are then de-phased with respect to each other in the spectral domain to reduce the maximum refractive index variation to an optimal value. Out-of-band areas of the reflection spectrum can be suppressed or included depending on the design requirements. Inverse scattering analysis is used to reconstruct the profile of refractive index variation in the spatial domain from the de-phased partial reflection spectra.

The spectral dephasing design method overcomes some of the disadvantages associated with periodic sampling. Inverse scattering analysis achieves an exact translation from the spectral domain to the spatial domain. Consequently grating structures designed using this method possess a reflection spectrum which closely matches the desired reflection spectrum. In addition, it is possible to design multi-channel grating design with non-identical group-delay characteristics.

However spectral dephasing does not always result in an optimal maximum refractive index variation value. In many cases, spectral dephasing does not minimise the maximum refractive index variation to the extent possible. In particular, it has been found that the spectral dephasing design method does not result in an optimal maximum refractive index variation when designing multi-channel grating structures with channel to channel group delay which does not vary slowly or channel spacing which is not substantially equidistant.

FIGS. 5(a) to (d) show a multi-channel grating structure designed according to the process described in PCT/AU02/00307 which is assigned to the Applicant. FIGS. 6(a) to (d) show a multi-channel grating structure designed according to the process described in PCT/AU03/00959. As can be seen in both cases, the maximum refractive index variation of the grating structure is poorly optimised, to the extent that designs of the type illustrated in FIGS. 5(a) to (d) are impractical and difficult to achieve for most types of currently known grating fabrication techniques.

Reference to any background art in the specification is not, and should not be taken as, an acknowledgement, or suggestion, that this background art forms part of the common general knowledge in Australia or any other jurisdiction or that this background art could reasonably be expected to be ascertained, understood and regarded as relevant by a person skilled in the art.

SUMMARY OF THE INVENTION

It is an object of the present invention to substantially overcome, or at least ameliorate, one or more disadvantages of existing arrangements.

According to a first aspect of the invention there is provided a method of designing a multi-channel grating structure with at least one specified spectral characteristic in a photosensitive material, the multi-channel grating structure having at least one free spectral characteristic which is not a specified spectral characteristic, the method including:

a) providing an initial value for the or each free spectral characteristic;
b) providing an initial multi-channel grating function which describes an initial multi-channel grating structure in the photosensitive material by applying a spectral to spatial domain algorithm to the at least one specified predetermined spectral characteristic and using the at least one initial value;

c) providing a target multi-channel grating function which describes a target multi-channel grating structure in the photosensitive material;

d) providing an updated value for the or each initial value with reference to the spectral characteristics of the target multi-channel grating function;

e) providing an updated multi-channel grating function which describes an updated multi-channel grating structure in the photosensitive material by applying a spectral to spatial domain algorithm to the at least one predetermined spectral characteristic and using the at least one updated value; and f) outputting, after at least one iteration of steps a) to e), the updated multi-channel grating function to describe the multi-channel grating structure.

Preferably, the process of determining the at least one updated value includes:

determining an interim reflection spectrum of the target multi-channel grating function by applying a spatial to spectral domain algorithm to the target multi-channel grating structure; and determining the at least one updated value with reference to the interim reflection spectrum.

Conveniently, the method further includes repeating, until the updated multi-channel grating function meets predetermined optimisation criteria, steps a) to e), wherein the free spectral characteristics of step a) are taken from the updated multi-channel grating function of step e).

The optimisation criteria may relate to a comparison between the target multi-channel grating structure and the updated multi-channel grating structure.

The target multi-channel grating function may be provided with reference to the initial multi-channel grating function.

The target multi-channel grating function may be provided such that the target multi-channel grating function defines the same area as the initial multi-channel grating function.

The target multi-channel grating function may be provided such that the target multi-channel grating function describes a target multi-channel grating structure which has the same phase profile as the initial multi-channel grating structure.

The target multi-channel grating function may have a maximum refractive index variation which is less than a maximum refractive index variation of the initial multi-channel grating function.

In one form of the invention, the at least one free spectral characteristic includes relative phases of a plurality of partial single channel grating functions, each partial single channel grating function relating to one of the channels of the multi-channel grating structure;

The at least one initial value may include initial relative phases of a plurality of partial single channel grating functions, each partial single channel grating function relating to one of the initial multi-channel grating structure's channels.

The at least one updated value may include updated relative phases of a plurality of partial single channel grating functions, each partial single channel grating function relating to one of the updated multi-channel grating structure's channels.

The updated relative phase relating to each of the channels may be provided with reference to the phase of a reflection spectrum of the target multi-channel grating function in the centre of the channel.

In one from of the invention the at least one free value may include relative centre positions of centres of a plurality of partial single channel grating functions, each partial single channel grating function relating to one of the multi-channel grating structure's channels;

the at least one initial value may include initial relative centre positions of centres of a plurality of partial single channel grating functions, each partial single channel grating function relating to one of the initial multi-channel grating structure's channels; and the at least one updated value may include updated relative centre positions of centres of a plurality of partial single channel grating functions, each partial single channel grating function relating to one of the updated multi-channel grating structure's channels.

The updated relative centre positions relating to each of the channels may be provided with reference to the group delay of a reflection spectrum of the target multi-channel grating function in the centre of the channel.

The updated value for each of the initial values may be provided by taking a weighted sum of the initial values and a corresponding spectral characteristic of the target multi-channel grating function.

The initial value for each free spectral characteristics may be provided by:

providing an approximate multi-channel grating function which describes an approximate multi-channel grating structure which is approximately the multi-channel grating structure, the approximate multi-channel grating function representing a plurality of partial grating functions, each partial grating function describing an initial partial grating structure in the photosensitive material and representing the application of an exact spectral to spatial domain algorithm to a single channel reflection spectrum function, each single channel reflection spectrum function describing a portion of the at least one specified spectral characteristic which relates to a single channel;

providing initial phase shifts for each of the initial partial grating functions for which optimisation criteria are met, each initial phase shift being a phase shift of the initial partial grating function relative to a reference phase; and using the initial phase shifts as one of the initial spectral characteristics.

The method may further include:

determining initial position shifts for each of the initial partial grating functions for which optimisation criteria are met, each initial position shift being the position of a centre of the initial partial grating structure described by the initial partial grating function in the photosensitive material relative to a reference position; and using the initial position shifts as one of the initial spectral characteristics.

The optimisation criteria may be such that a maximum refractive index variation of the approximate grating structure is reduced.

The updated multi-channel grating function which describes an updated multi-channel grating structure in the photosensitive material may be provided by applying a spectral to spatial domain algorithm to the at least one specified spectral characteristic, using the at least one updated value and a predetermined out of band reflection spectrum.

According to a second aspect of the invention there is provided a method of designing a multi-channel grating structure in a photosensitive material, the grating structure having specified spectral characteristics, the method including:

providing a multi-channel grating design function which describes the multi-channel grating structure, the design function representing a plurality of partial grating functions, each partial grating function describing a partial grating structure in the photosensitive material;

in which:

each partial grating function represents the application of an exact spectral to spatial domain algorithm to a single channel reflection spectrum function, each single channel reflection spectrum function describing a portion of the specified spectral characteristics which relates to a single channel;

at least one of the partial grating functions is phase shifted by a phase shift relative to the other partial grating functions; and at least one of the partial grating functions has a centre grating position in the photosensitive material which is shifted by a position shift relative to the other partial grating functions.

At least one and preferably more than one of the partial grating functions may be substantially different to the other partial grating functions.

The invention further provides a method of designing a multi-channel grating structure in a photosensitive material, the grating structure having predetermined spectral characteristics, the method including:

providing a multi-channel grating design function which describes the multi-channel grating structure, the design function representing a plurality of partial grating functions, each partial grating function describing a partial grating structure in the photosensitive material;

in which:

each partial grating function represents the application of an exact spectral to spatial domain algorithm to a single channel reflection spectrum function, each single channel reflection spectrum function describing a portion of the predefined spectral characteristics which relates to a single channel;

at least one of the partial grating functions is phase shifted by a phase shift relative to the other partial grating functions; and at least one of the partial grating functions is different to the other partial grating functions.

The invention further provides a multi-channel grating structure which is designed according to any one of the above described methods, and a multi-channel grating structure with a profile of refractive index variation along at least one dimension which is designed according to any one of the above described methods.

The invention further provides a multi-channel grating structure with a profile of refractive index variation along at least one dimension which represents a plurality of partial gratings functions in which:

each partial grating function represents the application of an exact spectral to spatial domain algorithm to a single channel reflection spectrum function, each single channel reflection spectrum function describing a portion of the predefined spectral characteristics which relate to a single channel, at least one of the partial grating functions is phase shifted by a phase shift relative to the other partial grating functions; and at least one of the partial grating functions has a centre grating position in the photosensitive material which is shifted by a position shift relative to the other partial grating functions.

Preferably, at least one of the partial grating functions is substantially different to the other partial grating functions.

The invention still further provides a non-spatially shifted multi-channel grating structure having a plurality (N) of channels with at least some channels having substantially non-identical spectral characteristics, wherein the maximum refractive index variation has an optimisation limit proportional to the average maximum refractive index change for a single channel grating structure and the square root of the number of channels N.

Preferably, the optimisation limit of a non-spatially-shifted multi-channel grating structure is defined by the formula:

$$\Delta n_N^{(max)} = N^{1/2} \Delta n_s^{(av)}$$

where:

N=no of channels $\Delta n_N^{(max)}$=maximum refractive index change for a multi-channel grating structure $\Delta n_s^{(av)}$=average maximum refractive index change for the corresponding partial single channel grating structures.

All of the channels may have substantially non-identical spectral characteristics.

BRIEF DESCRIPTION OF THE DRAWINGS

An embodiment of the present invention is described below with reference to the Figures, in which.

DETAILED DESCRIPTION OF THE EMBODIMENTS

Figure 1:
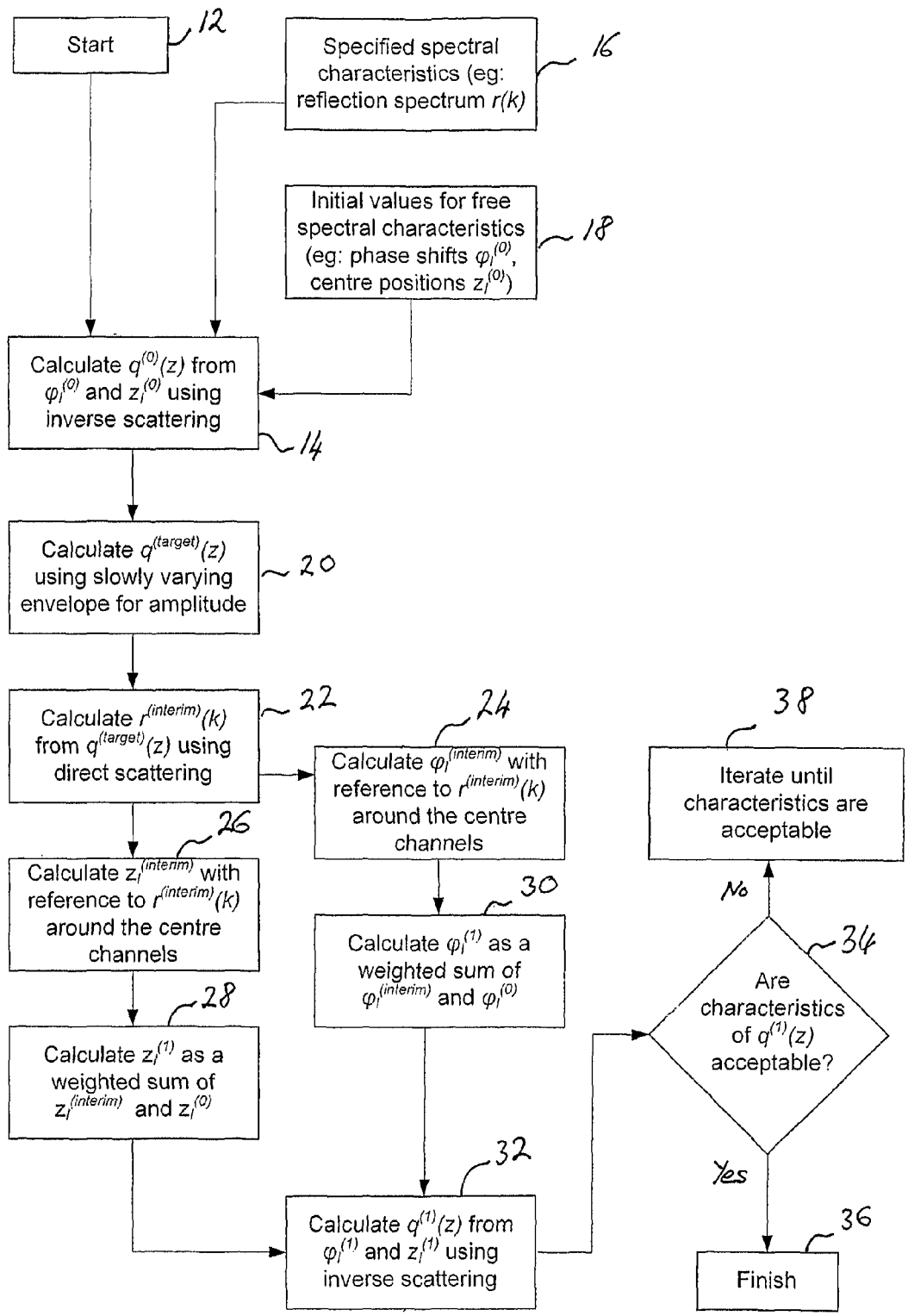
FIG. 1 shows a flow diagram of a first phase involving a single iteration of an embodiment of a method for designing optimised multi-channel grating structures.

The following description refers to preferred embodiments of the present invention. To facilitate an understanding of the present invention, reference is made to the accompanying drawings which illustrate preferred embodiments of the present invention. Similar stages in each figure have been labelled with the same number for ease of explanation.

The present invention provides a procedure for designing multi-channel grating structures which reduces the maximum refractive index variation required to write the grating structure in a photosensitive material. Throughout the specification the concept of reducing the maximum refractive index variation required for a given grating structure without changing certain of the spectral characteristics of the grating structure will be referred to as "optimisation" or "optimising" the design of the grating structure. The design procedure may be used to optimise grating designs with significantly different group delay characteristics between the spectral channels and/or substantially non-equidistant channel spacing. Such grating structures could not be readily optimised using existing procedures.

Multi-channel grating structures are used in a variety of different applications. For any given application, a multi-channel grating structure with certain specified spectral characteristics is generally required. Throughout the specification, these characteristics will be referred to as "specified". Any multi-channel grating structure designed for that application must possess the specified spectral characteristics.

However in almost all cases, not all spectral characteristics are specified. Generally there will be a number of spectral characteristics which are not specified and can be changed, or changed within a range, without affecting the suitability of the grating structure for the particular application. Throughout the specification these spectral characteristics will be referred to as "free".

An example of one application for a multi-channel grating structure is a multi-channel dispersion compensator. Spectral characteristics which are typically specified for a multi-channel dispersion compensator include:
(a) the number of channels;
(b) the channel spacing (that is the distance between adjacent channel centres in the spectral domain);
(c) the channel bandwidth (that is the width of each channel in the spectral domain);
(d) minimum acceptable reflection strengths within the specified channel bandwidth;
(e) dispersion values for each channel (often referred to as $D_2$ values);
(f) dispersion slope values (often referred to as $D_3$ values); and
(g) the maximum acceptable group delay ripple level.

Spectral characteristics which are typically not specified or are free include:
(a) the specific shape of the reflection profile in the spectral domain;
(b) group delay values for each spectral channel centre (often referred to as $D_1$ values); and
(c) relative phase shifts for each spectral channel $\phi_l$.

The method described herein optimises the design of multi-channel grating structures by optimising the free spectral characteristics through an iterative process. The optimisation process requires initial values for the free spectral characteristics. A good selection of these initial values significantly improves the efficiency and results of the optimisation process. The initial values can be determined using a pre-optimisation process which is described below. The initial values for the free spectral characteristics are then optimised using the iterative approach.

Figure 2:
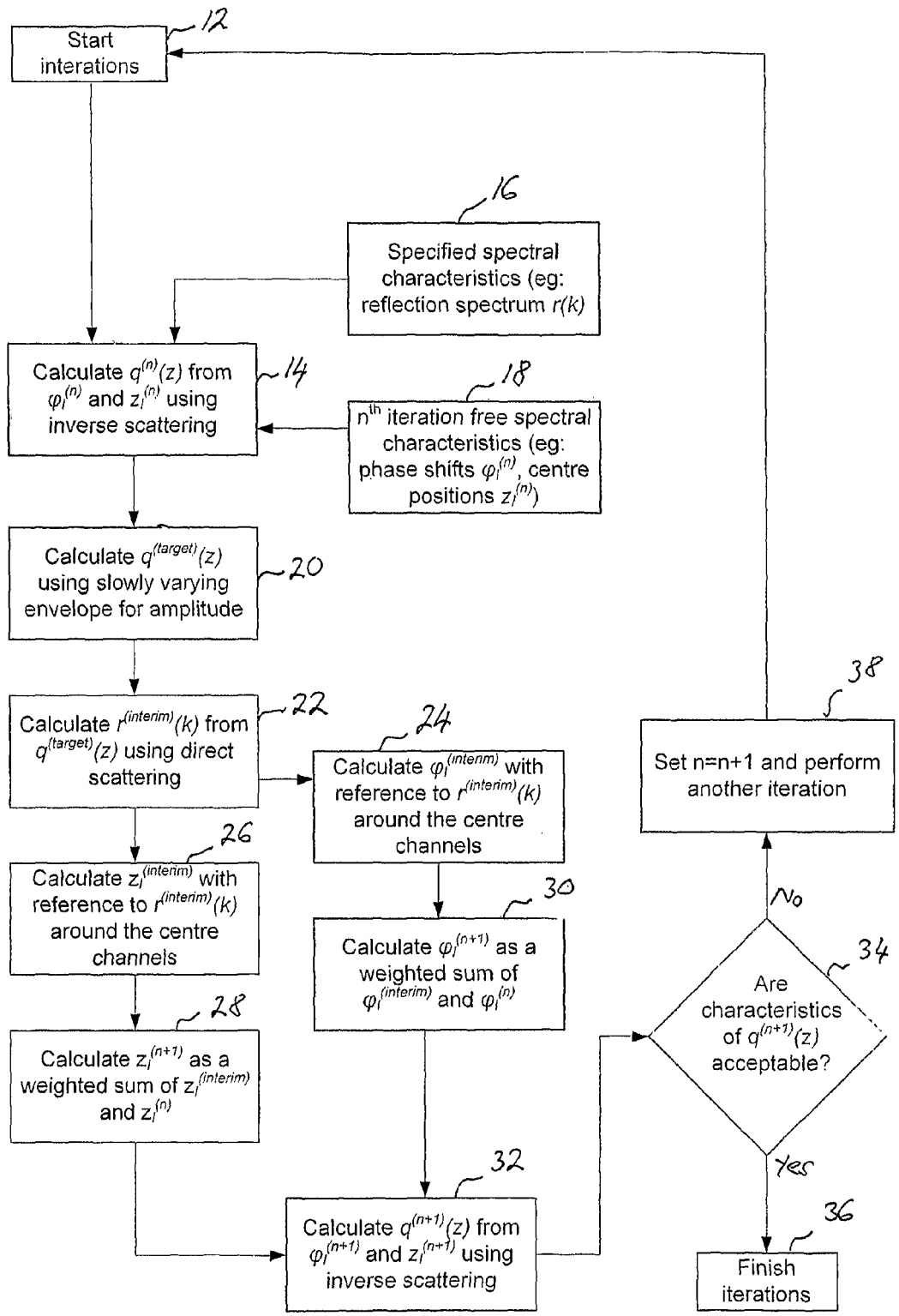
FIG. 2 shows a flow diagram illustrating an iterative version of the design method of FIG. 1.

The optimisation process is shown in FIGS. 1 and 2 as a flow diagram. The optimisation process starts at stage 12 and may be performed by software running on a computational device, for example a standard computer. The method could also be implemented in customised hardware such as an ASIC. The next stage 14 is to determine a function that describes an initial multi-channel grating structure $q^{(0)}(z)$. The function $q^{(0)}(z)$ describes the profile of refractive index variation in a photosensitive material as a function of z, the distance from a reference point. $q^{(0)}(z)$ is calculated using the specified spectral characteristics and the initial values for the free spectral characteristics, which are specified in stages 16 and 18 respectively. A spectral to spatial domain algorithm is used to determine the multi-channel grating structure $q^{(0)}(z)$ which has the specified spectral characteristics and the initial values for the spectral characteristics.

There are a number of spectral to spatial domain algorithms which are suitable for use in stage 14. One such algorithm is the inverse scattering algorithm. An advantage of inverse scattering is that a grating structure with exactly the specified spectral characteristics and the initial values for the spectral characteristics is calculated.

The inverse scattering algorithm is applied to the specified reflection spectrum r(k) which is, or satisfies, the specified spectral characteristics. r(k) is a function of k, the wave number, and represents an amplitude component (R(k)) and a phase component ($\psi(k)$). For a given reflection spectrum which is defined for the entire spectrum, the inverse scattering algorithm results in a unique grating structure.

However, a multi-channel reflection spectrum generally consists of N channels, where the amplitude of the spectrum is negligible between the channels. This means that the phase component of r(k) is undefined in these regions. Consequently the partial spectral channels may be phase shifted relative to each other without altering the specified spectral characteristics within any of the channels. This means that phase shift values can be freely selected to optimise the multi-channel grating structure. The phase shift of each of the N partial spectral structures relative to a reference point will be termed $\phi_l$, where l denotes the channel number. Since $\phi_l$ values do not affect r(k) within the channels, in almost all instances they will be free spectral characteristics.

When inverse scattering is used to determine $q^{(0)}(z)$ from r(k), another characteristic which can be manipulated is the relative group delays of the centres of each partial spectral channel (termed $D_1^{(l)}$ values where l denotes the channel number from 1 to N). Often the $D_1^{(l)}$ characteristics are not specified. In these cases $D_1^{(l)}$ values can also be freely selected to optimise the multi-channel grating structure. Otherwise $D_1^{(l)}$ must be set to comply with the specified spectral characteristics.

The $D_1^{(l)}$ group delay values of the centers of partial spectral channels are effectively equivalent to the center positions $$\left( z_l = \frac{D_1^{(l)}}{2} \right)$$

of the corresponding partial grating structures obtained from partial spectra via the inverse scattering algorithm. Thus, substantially different $D_1^{(l)}$ values effectively results in the partial grating structures related to each channel being more weakly overlapped. Widely spaced values for the centre positions $z_l$ result in a longer multi-channel grating structure. If the multi-channel grating structure becomes too long, this may be a disadvantage in certain applications.

By introducing phase shifts only, it is possible to approach the previously known optimisation limit for the maximum refractive index variation of a multi-channel grating with identical or close to identical spectral channels referred to in PCT/AU03/00959. This limit is that the maximum refractive index change for the multi-channel grating structure $\Delta n_N^{(max)}$ is proportional to the maximum refractive index change for any partial single-channel grating structure $\Delta n_s$ and the square root of the number of channels N, or:

$$\Delta n_N^{(max)} = N^{1/2} \Delta n_s \quad (1)$$

The methods described herein allow approaching a similar limit for the case of multi-channel gratings with substantially non-identical spectral characteristics. In this case the optimisation limit is proportional to the average maximum refractive index change for a single channel grating structure $$\Delta n_s^{(av)} = \sum_{i=1}^{N} \Delta n_s^{(i)} / N$$

and the square root of the number of channels N, or:

$$\Delta n_N^{(max)} = N^{1/2} \Delta n_s^{(av)} \quad (2)$$

By more weakly overlapping (i.e. shifting spatially with respect to each other) the partial grating structures, it is possible to reduce the maximum refractive index variation further beyond this limit and approach:

$$\Delta n_N^{(max)} = N^0 \Delta n_s^{(high)} = \Delta n_s^{(high)} \quad (3)$$

where $\Delta n_s^{(high)}$ represents $\Delta n_s$ for the highest single channel which is effectively the limit for a single-channel grating structure.

To obtain a multi-channel reflection spectrum with the specified channel spacing $\Delta k_l$, the reflection spectra for all partial grating structures are appropriately shifted in the spectral domain and then superimposed, for example:

$$r(k) = \sum_{l=1}^{N} r_l \left( k - \frac{2l - N - 1}{2} \Delta k_l \right). \quad (4)$$

The strength and width of each channel is allowed to be different from one another. A number of different models may be used to describe the reflection amplitudes of the channels. For instance, the reflection amplitudes may be described as the super Gaussian profiles:

$$|r_l(k)| = \sqrt{R_{max}^{(l)}} \exp[-(k/\Delta k_{width}^{(l)})^{2p}], \quad (5)$$

where $R_{max}^{(l)}$ is the maximum reflection of the l channel, $\Delta k_{width}^{(l)}$ is the half-width of the l channel and p is the order of super-Gaussian shape.

Any phase function of the channels can be expanded in a Taylor series and presented in the form:

$$\Psi_l(k) = \varphi_l + D_1^{(l)} k + \frac{1}{2} D_2^{(l)} k^2 + \frac{1}{6} D_3^{(l)} k^3 + \ldots \quad (6)$$

Depending on which spectral characteristics are specified, some or the entire set of the $D_1^{(l)}, D_2^{(l)}$, etc coefficients must be selected to comply with those specified spectral characteristics. For example, in the case of a typical filter design, dephasing angles $\phi_l$ and $D_1^{(l)}$ coefficients are not specified and can be chosen arbitrarily. In the case of a dispersion compensator, it is crucial to fix the dispersion coefficients, i.e. $D_i^{(l)}$ ($i \geq 2$), whereas the rest of the coefficients are not specified. The present invention capitalises on the flexibility associated with the free spectral characteristics.

In the following description, it will be assumed that $D_1^{(l)}$ (or equivalently $z_l$) is a free spectral characteristic. If this is not the case, the process must be modified so that $z_l$ values are set and are not optimised.

Assuming the free spectral characteristics are $\phi_l$ and $z_l$, initial values $\phi_l^{(0)}$ and $z_l^{(0)}$ are provided at stages 16 and 18. The process for determined these initial values is described in more detail below. $q^{(0)}(z)$ is calculated using inverse scattering for $\phi_l^{(0)}, z_l^{(0)}, r(k)$ and any other relevant specified spectral characteristics.

The function $q^{(0)}(z)$ obtained in stage 14 will likely have a number of high amplitude peaks and consequently will not be optimised to an acceptable level. In stage 20, $q^{(0)}(z)$ is replaced with a function describing a target grating structure $q^{(t\ arg\ et)}(z)$ which has a more desirable shape. The target grating function $q^{(t\ arg\ et)}(z)$ is selected so that the grating structure described has a reduced maximum refractive index variation. $q^{(t\ arg\ et)}(z)$ is selected to have the same invariant area as $q^{(0)}(z)$ and typically keeps the grating phase profile of $q^{(0)}(z)$ intact. This process can be effectively thought of as smoothing the amplitude of $q^{(0)}(z)$ to determine a new grating structure.

A number of different $q^{(t\ arg\ et)}(z)$ functions may meet these criteria. A preferred function for $q^{(t\ arg\ et)}(z)$ is formed by replacing the amplitude of $q^{(0)}(z)$ with the slowly varying envelope, $q^{(slow)}(z)$ of $q^{(0)}(z)$. The slowly varying envelope may be calculated from the following formula:

$$q^{(slow)}(z) = \sqrt{\sum_{l=1}^{N} |\kappa_l(z - z_l)|^2} \quad (7)$$

where $\kappa_l(z)$ is the partial grating structure for the $l^{th}$ channel and the grating phase profile is kept intact such that:

$$q^{(0)}(z) \rightarrow q^{(slow)}(z) \frac{q^{(0)}(z)}{|q^{(0)}(z)|} \quad (8)$$

Another appropriate selection for $q^{(t\ arg\ et)}(z)$ is an apodised (smoothened) square like shape. The advantage of such a shape is that complete utilisation of the refractive index photosensitivity is used.

At stage 22, the reflection spectrum of $q^{(t\ arg\ et)}(z)$ is calculated using a spatial to spectral domain algorithm. A number of spatial to spectral domain algorithms are suitable. A preferred algorithm is direct scattering, since this exactly calculates the resulting reflection spectrum. The reflection spectrum is used as an interim spectrum, $r^{(int\ erim)}(k)$. At stages 24 and 26, interim values for $\phi_l$ and $z_l$ are calculated from $r^{(int\ erim)}(k)$. The interim phase shift values $\phi_l^{(int\ erim)}$ are calculated as the phase value of the complex reflection coefficient of $r^{(int\ erim)}(k)$ in the channel centres. The interim centre positions $z_l^{(int\ erim)}$ are calculated using their direct relationship to group delay values of $r^{(int\ erim)}(k)$ in the channel centres. For example, the following equation is used:

$$z_l^{(interim)} = \frac{D_1^{(l)}}{2} = \frac{1}{2} \frac{d\psi}{dk} \bigg|_{k=(1+N-2l)\Delta k_l/2} \quad (9)$$

where $\psi(k)$ is calculated from:

$$e^{i\psi(k)} = \frac{r^{(interim)}(k)}{|r^{(interim)}(k)|} \qquad (10)$$

Alternatively, averaged or fitted values of $\phi_l^{(int\ erim)}$ and $z_l^{(int\ erim)}$ for a series of points about the channel centres are used to approximate the phase values and group delay values in the channel centres.

New values $\phi_l^{(1)}$ and $z_l^{(1)}$ for $\phi_l^{(0)}$ and $z_l^{(0)}$ are calculated at stages 28 and 30 using a weighted sum. The weighted sums may be expressed as:

$$\phi_l^{(1)} = \phi_l^{(0)} + g \cdot \Delta\phi_l \qquad (11)$$

where:

$$\Delta\phi_l = \phi_l^{(int\ erim)} - \phi_l^{(0)} \qquad (12)$$

and $$z_l^{(1)} = b z_l^{(int\ erim)} + (1-b) z_l^{(0)} \qquad (13)$$

g and b are weighting coefficients. The use of a weighting sum and weighting coefficients allows for a better control over the convergence and stability of the iteration process. It has been found that small weighting coefficients are preferable. An appropriate range for g is typically between 0.02 and 0.2. If out of band spectral response is allowed, g should be in the range of 0.05 to 0.2. A smaller value for g makes convergence of the process safer whilst an increased value for g generally leads to a faster improvement of the maximum refractive index variation, but sometimes may lead to iterative scheme divergence, b is generally of the same order as g.

Once $\phi_l^{(1)}$ and $z_l^{(1)}$ has been calculated, these values, together with the specified spectral characteristics, such as r(k), are used to calculate the next iteration of the function describing the multi-channel grating structure $q^{(1)}(z)$. To do this a spectral to spatial domain algorithm is used. This process is similar to stage 14, except the new values $\phi_l^{(1)}$ and $z_l^{(1)}$ are used instead of the old values $\phi_l^{(1)}$ and $z_l^{(1)}$. This approach has been found to cause q(z) to assume an improved shape which is closer to $q^{(target)}(z)$, thereby optimising the multi-channel grating structure.

After the first iteration, the characteristics of $q^{(1)}(z)$ are assessed at stage 34. This may be done, for example, by comparing $q^{(1)}(z)$ with the target grating structure $q^{(target)}(z)$. If $q^{(1)}(z)$ is sufficiently close to $q^{(target)}(z)$, then $q^{(1)}(z)$ is output as a function describing an acceptable multi-channel grating structure and the process stops at stage 36. If $q^{(1)}(z)$ is not acceptable, then further iterations are performed at stage 38.

To perform further iterations, the process shown in FIG. 1 is repeated, replacing $\phi_l^{(0)}$, $z_l^{(0)}$ and $q^{(0)}(z)$ with $\phi_l^{(0)}$, $z_l^{(1)}$ and $q^{(1)}(z)$, to produce the next iteration values $z_l^{(2)}$, $\phi_l^{(2)}$ and $q^{(2)}(z)$. New values for $q^{(target)}(z)$, $r^{(int\ erim)}(k)$, $\phi_l^{(int\ erim)}$ and $z_l^{(int\ erim)}$ will also be calculated during the next iteration. FIG. 2 shows a generalisation of the iterative process in which values for the (n+1) iteration are calculated using the value from the n iteration. Each stage in the (n+1) iteration is as described above with respect to FIG. 1. Each iteration results in new values for $\phi_l^{(n)}$, $z_l^{(n)}$ and $q^{(n)}(z)$ which are used in the next iteration (stage 40).

During iteration of the design method for the multi-channel grating structure, in the case of the phase shifts $\phi_l$ care need to be taken to avoid ramping effects related to $2\pi$ periodicity. The problem arises because during numerical calculations, the phase shifts are mapped on a $2\pi$ interval only (for instance, from $-\pi$ to $\pi$). For example, if $\phi_l^{(int\ erim)} = 0.9\pi$ and $\phi_l^{(n)} = -0.9\pi$, then it appears that $\Delta\phi_l = 1.8\pi$. However, this value should be mapped back into the $-\pi$ to $\pi$ interval, resulting in $\Delta\phi_l = 0.2\pi$. In other words, if $|\Delta\phi_l| > \pi$, then $2\pi$ must be added or subtracted so that $\Delta\phi_l$ lies within the $-\pi$ to $\pi$ interval.

Depending on the application for the multi-channel grating structure, out of band responses may be specified to be zero, or may be allowed to be arbitrary. If out of band responses are required to be zero, then the specified reflection spectrum r(k) is used. If out of band responses are not specified and can be arbitrary, then only the in band portions of the specified reflection spectrum r(k) are used and for each iteration the out of band portions of $r^{(int\ erim)}(k)$ are concatenated to the lower and high frequency areas of r(k).

The initial values $\phi_l^{(0)}$ and $z_l^{(0)}$ may be obtained using a number of different methods. A method which has been found to be effective is to approximate the multi-channel grating structure as:

$$\tilde{q}(z) \approx \sum_{l=1}^{N} \kappa_l(z - z_l) e^{-i[z(2l-N-1)\Delta k_l + \phi_l]} \qquad (14)$$

where partial gratings $\kappa_l(z)$ are obtained from the individual channel spectral data described in equation (3) using a spectral to spatial domain algorithm, for example inverse-scattering methods or some analytical approximations. The shifts of the grating central positions $z_l$ are directly related to the coefficients in equation (6) since:

$$z_l = D_l^{(1)}/2 \qquad (15)$$

if the normalisation convention described in J. Skaar, L. Wang, and T. Erdogan, "On the Synthesis of Fiber Bragg Gratings by Layer Peeling", IEEE J. Quantum Electron. 37, 165-173 (2001) is used.

The approximated grating structure $\tilde{q}(z)$ described in equation (14) has been found to be useful for obtaining the initial values $\phi_l^{(0)}$ and $z_l^{(0)}$. This is because the approximation $\tilde{q}(z)$ of equation (14) is exact in the limit of weak gratings, where inverse scattering analysis is essentially equivalent to a Fourier transform (i.e.: at the linear limit, where the direct superposition provides an exact solution).

To find the initial values $\phi_l^{(0)}$ and $z_l^{(0)}$ using equation (14) a pre-optimisation process is used. The process has been termed pre-optimisation because it is in effect a preliminary optimisation process to obtain partially optimised values for $\phi_l$ and $z_l$. These values are used as the initial values $\phi_l^{(0)}$ and $z_l^{(0)}$, and are optimised further using the iterative process described with reference to FIGS. 1 and 2.

Pre-optimisation of $\phi_l$ and $z_l$ is achieved by numerically searching for phase shift and centre position values which meet certain criteria. One approach is to construct and minimise a merit function which is related to the maximum refractive index value of the grating structure $\tilde{q}(z)$ described by equation (14). A preferred merit function measures the difference between the integral area of $\tilde{q}(z)$ and a target grating structure. To be suitable, the target grating structure must have the same invariant area as $\tilde{q}(z)$, described by:

$$\int_0^z |\tilde{q}(z)|^2 dz \qquad (16)$$

Functions with square like or bell like shapes may be used. A preferred target grating structure is described by the slowly varying envelop of q̃(z):

$$q^{(slow)}(z; z_l) = \sqrt{\sum_{l=1}^{N} |\kappa_l(z - z_l)|^2} \quad (17)$$

Using equation (17), the merit function can be presented as:

$$\Delta(\{\phi_l\}, \{z_l\}) = \sqrt{\int_0^z [|\tilde{q}(z, \{\phi_l\}, \{z_l\})| - q_{slow}(z; z_l)]^2 dz} \quad (18)$$

Equation (17) is minimised, under appropriately chosen constraints on the grating length, using one of a number of suitable techniques, for instance the Powell algorithm, simulated annealing or evolutional algorithms.

The convergence and calculation speed of the pre-optimisation procedure, together with the quality of the final results, are significantly improved by providing the gradient of the merit function. The gradient of the merit function described in equation (18) is:

$$\frac{\partial \Delta}{\partial \phi_l} = \frac{1}{\Delta} \int_0^z (q_{slow}(z - z_l) - |\tilde{q}(z - z_l)|) \quad (19)$$

$$\text{Im}\left\{\frac{\tilde{q}^*(z - z_l)}{|\tilde{q}(z - z_l)|} \kappa_l(z - z_l) e^{-i[\phi_l - (2l-N-1)\Delta\kappa_l z)]}\right\} dz,$$

$$\frac{\partial \Delta}{\partial z_l} = \frac{1}{\Delta} \int_0^z (q_{slow}(z - z_l) - |\tilde{q}(z - z_l)|) \text{Re}$$

$$\left\{\frac{\tilde{q}^*(z - z_l)}{|\tilde{q}(z - z_l)|} \kappa'_l(z - z_l) e^{i[\phi_l - (2l-N-1)\Delta\kappa_l z]}\right\} dz -$$

$$-\frac{1}{\Delta} \int_0^z (q_{slow}(z - z_l) - |\tilde{q}(z - z_l)|) \text{Re}\left\{\frac{\kappa'_l(z - z_l)\kappa_l^*(z - z_l)}{q_{slow}(z - z_l)}\right\} dz,$$

where an asterisk denotes the complex conjugate, the prime symbol stands for the derivative with respect to z and Re, Im stand for the real and imaginary parts of the corresponding functions, respectively. Once all partial gratings $\kappa_l(z)$ and slowly varying envelope $q_{slow}(z)$ profiles are calculated and stored, the calculation of merit function (18) and its gradient (19) is a reasonably straightforward task.

A common problem associated with optimisation of any non-linear functional is a stagnation of the searching procedure in a local (sub-optimal) minimum, rather than a global minimum. To overcome this issue, a preferred approach for minimising the merit function (18) is to use many repeated gradient searches with randomly chosen initial conditions for $\phi_l$ and $z_l$. The number of repeat searches required to obtain a good optimisation increases with the number of channels. The pre-optimised values for $\phi_l$ and $z_l$ which are obtained are used as the initial values for $\phi_l^{(0)}$ and $z_l^{(0)}$ in the optimisation process described with reference to FIGS. 1 and 2.

Although the present invention is described for one-dimensional grating structures, it is directly applicable for the design of two-dimensional structures such as holographic Bragg reflectors and their three-dimensional generalisations. In such cases, the spectral optimisation is conducted using the algorithmic procedure of FIGS. 1 and 2, whereas the design of spatial focusing curvatures may be done using conventional reflector design approaches.

Figure 3:
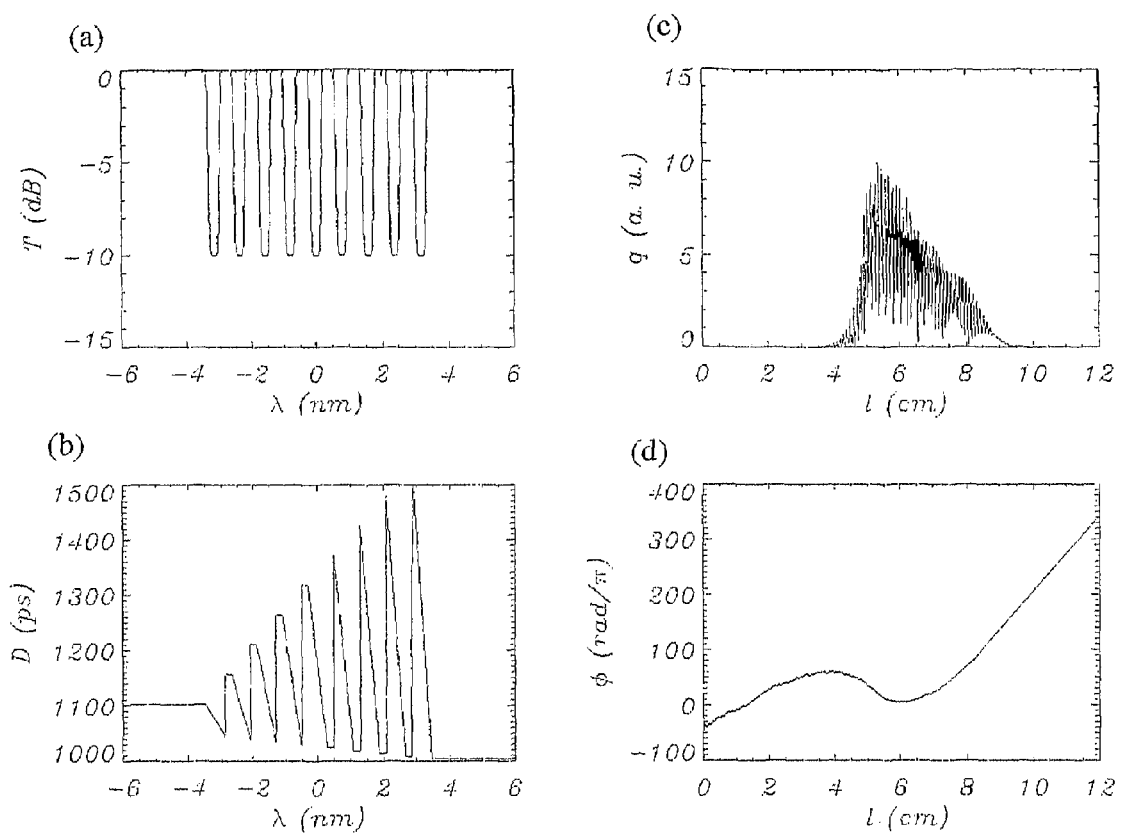
FIGS. 3a to 3d show graphical representations of characteristics of a multi-channel grating structure designed according to the methods of FIGS. 1 and 2, illustrating at 3(a) a reflection spectrum, at 3(b) the group delay of a grating structure, at 3(c) the refractive index variation of a grating structure, and at 3(d), the variation in phase along the grating structure (for the case presented in FIG. 3 it is assumed that neither relative spatial shifts between partial gratings nor out-band additional (small) spectral channels are allowed by the corresponding specifications (i.e. only relative phase shifts are utilised in the optimisation procedure))
Figure 5:
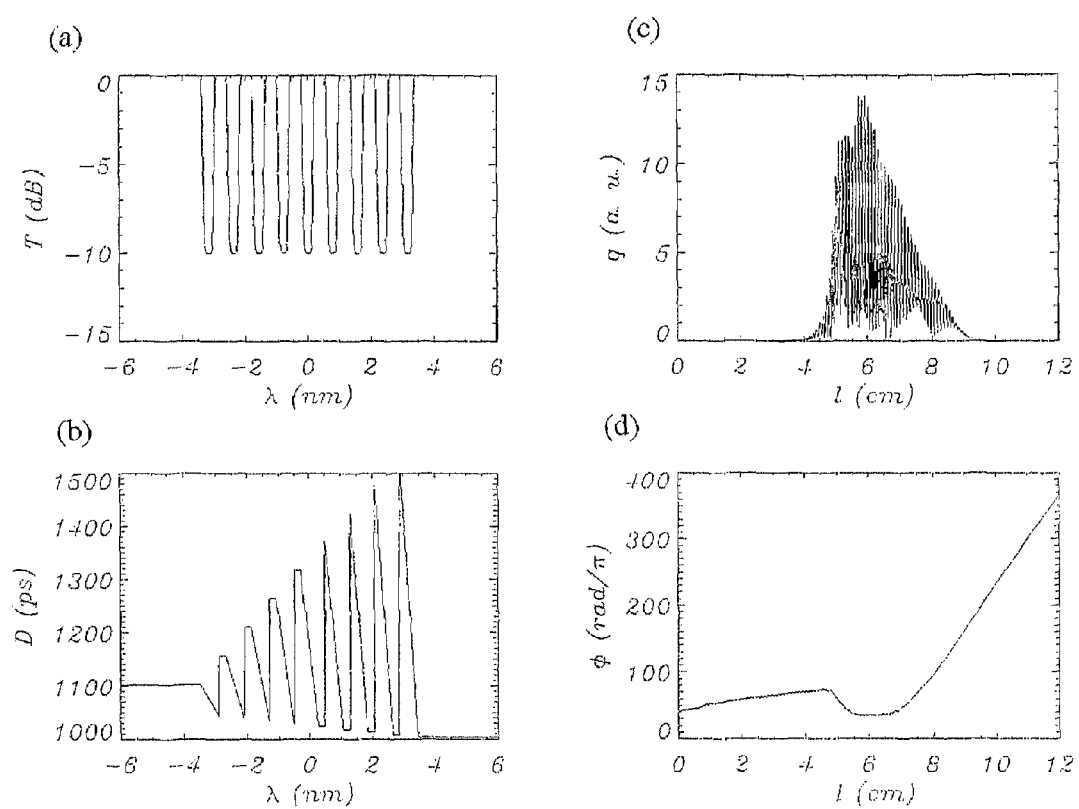
FIGS. 5a to 5d show a related art multi-channel grating structure illustrating, respectively, a reflection spectrum, the group delay, the variation in refractive index and the variation in phase.

FIGS. 3(a) to (d) show a multi-channel grating structure designed according to the methods described herein. As can be seen in FIG. 3(a) the reflection spectrum of the multi-channel grating structure is substantially perfect. FIG. 3(b) shows the group delay of the grating structure which is also substantially perfect (i.e. fits the required specifications substantially perfectly). FIG. 3(c) shows a maximum refractive index variation of around 10. This multi-channel grating structure can be contrasted with FIGS. 5(a) to (d) which show a multi-channel grating structure with the same reflection spectrum designed using the procedure described in PCT/AU02/00307 which is assigned to the Applicant. FIG. 5(c) shows a maximum refractive index variation of around 14, which is significantly greater than 10, and which does not represent a design that can be realised in practical terms for most types of currently known grating fabrication techniques.

Figure 4:
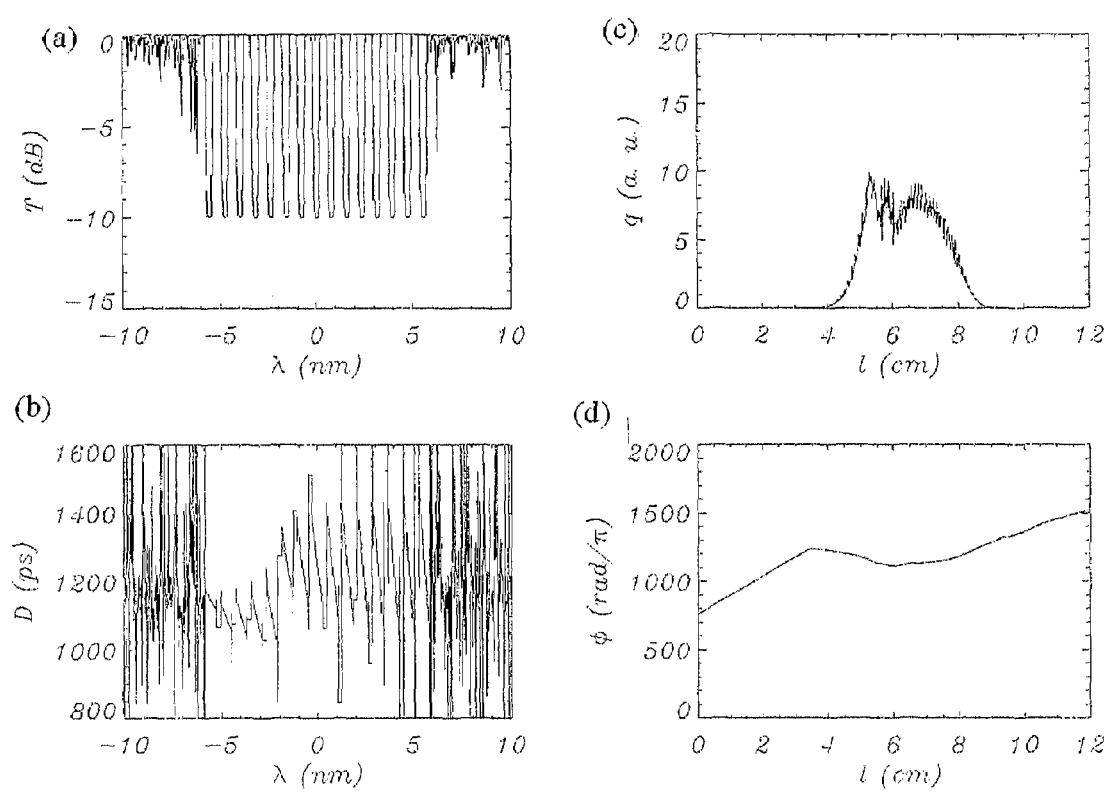
FIGS. 4a to 4b show characteristics of a second multi-channel grating structure designed using the methods of FIGS. 1 and 2 showing, respectively, a reflection spectrum, the group delay, the variation in refractive index and the phase variation (for the case presented in FIG. 4 it is assumed that both relative spatial shifts between partial gratings and out-band additional (small) spectral channels are allowed by the corresponding specifications (i.e. a broad range of design free parameters are utilised in the optimisation procedure))
Figure 6:
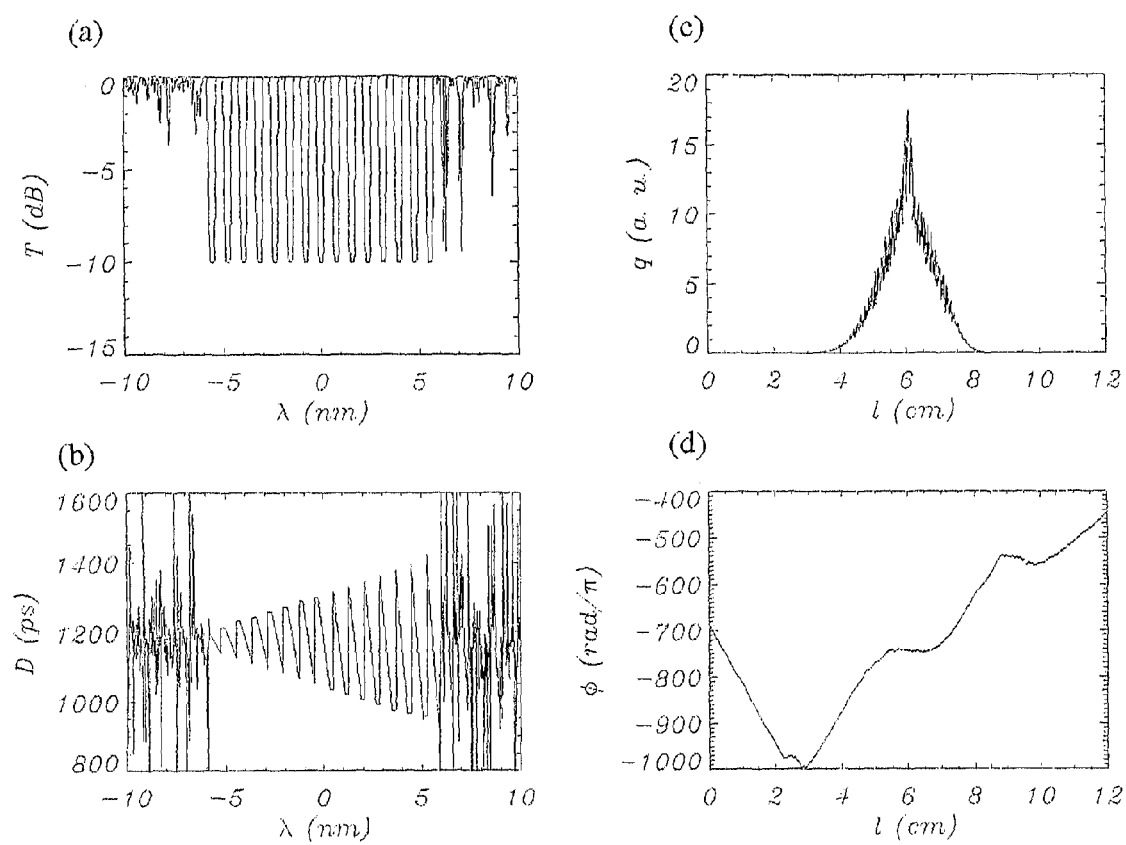
FIGS. 6a to 6d show a further related art multi-channel grating structure illustrating, respectively, a reflection spectrum, the group delay, the variation in refractive index and the variation in phase.

FIGS. 4(a) to (d) show a multi-channel grating structure designed according to the methods described herein. As can be seen in FIG. 4(a) the reflection spectrum of the multi-channel grating structure is substantially improved and includes out of band responses. FIG. 4(c) shows a maximum refractive index variation of around 10. This multi-channel grating structure can be contrasted with FIGS. 6(a) to (d) which show a multi-channel grating structure with the same in-band reflection spectrum designed using the procedure described in PCT/AU03/00959. FIG. 6(c) shows a maximum refractive index variation of around 18, which is significantly greater than 10, and which does not represent a design that can be readily realised in practical terms for most types of currently known grating fabrication techniques.

A multi-channel grating structure designed using the above method may be created using a number of known techniques. These techniques include, separately or in combination, photo-induced refractive index variation in photo-sensitive waveguide materials, etching techniques including etching techniques utilising a phase mask, epitaxial techniques and lithographic techniques. A technique for writing the multi-channel grating structure is briefly described with reference to FIG. 7.

Figure 7:
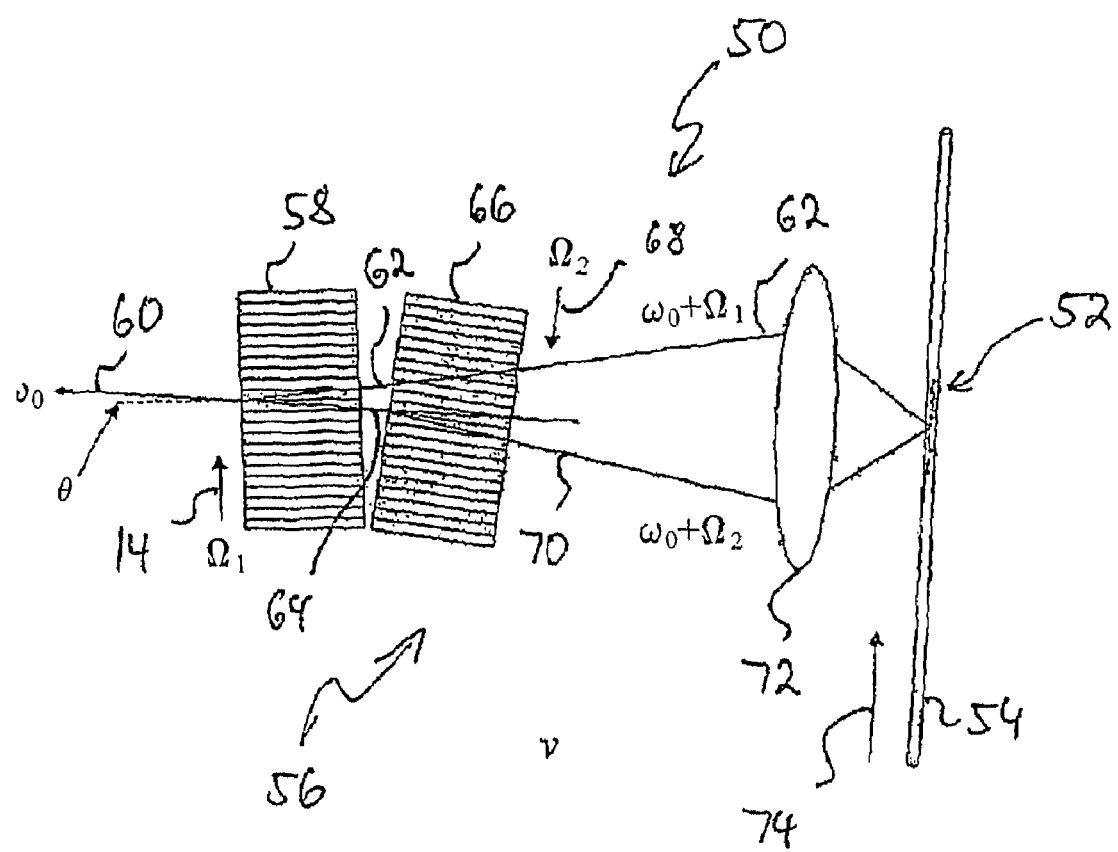
FIG. 7 shows a schematic diagram of apparatus for writing a multi-channel grating structure designed according to the methods of FIGS. 1 and 2.

FIG. 7 shows an example experimental set up 50 for writing a multi-channel grating 52 into an optical fibre 54. The experimental set up 50 comprises an interferometer 56 which includes a first acousto-optic modulation 58 being operated under an acousto-optic wave of a first frequency $\Omega_1$, as indicated by arrow 14. An incoming light beam 60 is incident on the first acousto-optic modulator 58 under a first order Bragg angle. The operating conditions of the acousto-optic modulator 58 are chosen such that the modulator 58 is under driven, whereby approximately 50% of the incoming beam 60 is diffracted into a first order beam 62, and 50% passing through the acousto-optic modulator 58 as an un-diffracted beam 64. The un-diffracted beam 64 is incident on a second acousto-optic modulator 66 of the interferometer 56 under a first order Bragg angle, whereas the beam 62 is not. Accordingly, the beam 62 passing through the second acousto-optic modulator 66 without any significant loss.

The second acousto-optic modulator 66 is operated under an acousto-optic wave of a frequency $\Omega_2$, which propagates in a direction opposed the direction of the acousto-optic wave in the first modulator 58 as indicated by arrow 68. After the second acousto-optic modulator 66 the first order diffracted beam 70 and the beam 62 are frequency shifted in the same direction (e.g. higher frequency), but by different amounts i.e. $\Omega_1$ vs $\Omega_2$.

The beams 62, 70 are then brought to interference utilising an optical lens 72, and the resulting interference pattern (at numeral 74) induces refractive index changes in the photosensitive optical fibre 54, whereby a refractive index profile, i.e. grating structure 52, is created in the optical fibre 54. The optical fibre 54 is translated along the interferometer at a speed v, as indicated by arrow 74.

The experimental set up 50 shown in FIG. 7 can be utilised to write a multi-channel grating structure embodying a multi-channel grating design function obtained by the design methods described herein. A controller (not shown), which may be implemented as software running on a computer, provides suitable control of the first and second acousto-optic modulators 58, 66, and control of the speed v at any particular time. The multi-channel grating structure is written in a single process. The high spatial resolution required to implement the multi-channel design of the preferred embodiment is achieved in the set up shown in FIG. 7 by utilising optical lens 72, with the practical limit of the beam size in the focal plane preferably being of the order of the waveguide core size.

Figure 8:
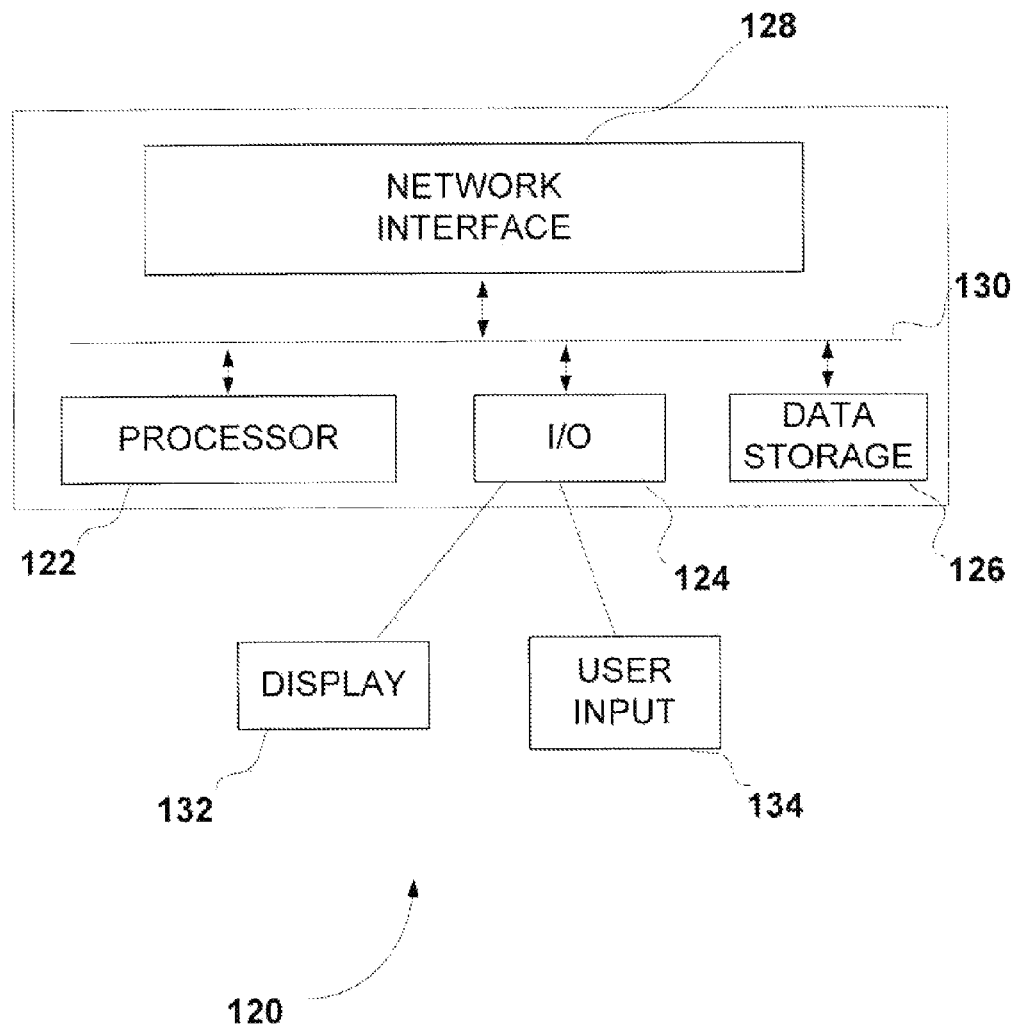
FIG. 8 shows a schematic diagram of general-purpose computer.

In one arrangement the described methods may be performed on a general-purpose computer as described with reference to FIG. 8. The computer 120 includes at least one processor 122 and data storage 126, which may include semiconductor random access memory (RAM) and read only memory (ROM). Data storage in the computer may also include a hard-disk drive and non-volatile sources of data such as CD-ROM or DVD.

The computer 120 typically includes input/output (I/O) drivers to provide access to user inputs 134 such as a keyboard and mouse and outputs such as a display 132. Speakers may also output audio information. A network interface system 128 provides access to the network 102.

The components of the computer 120 typically communicate via a bus 130. The methods described herein may be implemented via software instructions that are executed by the computer 120. The software may be stored in a computer readable medium and loaded onto the computer 120. A computer readable medium having software recorded on it is a computer program product The invention disclosed and defined in this specification extends to all alternative combinations of two or more of the individual features mentioned or evident from the text or drawings. All of these different combinations constitute various alternative aspects of the invention.

The term "comprises" (or its grammatical variants) as used in this specification is equivalent to the term "includes" and should not be taken as excluding the presence of other elements or features.

The claims defining the inventions are as follows:

1. A method of designing a multi-channel grating structure having at least one specified spectral characteristic in a photosensitive material, the multi-channel grating structure having at least one free spectral characteristic which is not a specified spectral characteristic, the method including:
    a) storing an initial value for the at least one free spectral characteristic on a computer-readable medium;
    b) utilizing a computer processor connected to the computer-readable medium to determine an initial multi-channel grating function that describes an initial multi-channel grating structure by applying a spectral to spatial domain algorithm to the at least one specified spectral characteristic using the at least one initial value;
    c) storing on a computer readable medium a target multi-channel grating function which describes a target multi-channel grating structure in the photosensitive material;
    d) utilizing the computer processor to determine an updated value for the at least one initial value with reference to the spectral characteristics of the target multi-channel grating function;
    e) utilizing the computer processor to determine an updated multi-channel grating function which describes an updated multi-channel grating structure in the photosensitive material by applying the spectral to spatial domain algorithm to the at least one specified spectral characteristic using the at least one updated value; and
    f) utilizing the computer processor to generate an output, after at least one iteration of a) to e), of the updated multi-channel grating function to describe the multi-channel grating structure having non-identical spectral channels and/or non-equidistant channel spacing.

2. The method of claim 1 wherein the process of determining the at least one updated value includes:
    utilizing the computer processor to determine an interim reflection spectrum of the target multi-channel grating function by applying the spatial to spectral domain algorithm to the target multi-channel grating function; and
    utilizing the computer processor to determine the at least one updated value with reference to the interim reflection spectrum.

3. The method of claim 1, further including repeating, until the updated multi-channel grating function meets predetermined optimization criteria, a) to e), wherein the at least one free spectral characteristic of step a) is taken from the updated multi-channel grating function of e).

4. The method of claim 3, wherein the optimization criteria relate to a comparison between the target multi-channel grating function and the updated multi-channel grating function.

5. The method of claim 1, wherein the target multi-channel grating function is provided with reference to the initial multi-channel grating function.

6. The method of claim 5 wherein the target multi-channel grating function is provided such that the target multi-channel grating function defines the same area as the initial multi-channel grating function.

7. The method of claim 5 wherein the target multi-channel grating function is provided such that the target multi-channel grating function describes a target multi-channel grating structure which has the same phase profile as the initial multi-channel grating structure.

8. The method of claim 5 wherein the target multi-channel grating function has a maximum refractive index variation which is less than a maximum refractive index variation of the initial multi-channel grating function.

9. The method of claim 1, wherein the at least one free spectral characteristic includes relative phases of a plurality of partial single channel grating functions, each partial single channel grating function relating to one of the channels of the multi-channel grating structure.

10. The method of claim 1 wherein the at least one initial value includes initial relative phases of a plurality of partial single channel grating functions, each partial single channel grating function relating to one of the initial multi-channel grating structure's channels.

11. The method of claim 1 wherein the at least one updated value includes updated relative phases of a plurality of partial single channel grating functions, each partial single channel grating function relating to one of the updated multi-channel grating structure's channels.

12. The method of claim 11 wherein the updated relative phase relating to each of the channels is determined with reference to the phase of a reflection spectrum of the target multi-channel grating function in the center of the channel.

13. The method of claim 1 wherein the at least one free value includes relative center positions of centers of a plurality of partial single channel grating functions, each partial single channel grating function relating to one of the multi-channel grating structure's channels.

14. The method of claim 13 wherein the at least one initial value includes initial relative center positions of centers of a plurality of partial single channel grating functions, each partial single channel grating function relating to one of the initial multi-channel grating structure's channels.

15. The method of claim 14 wherein the at least one updated value includes updated relative center positions of centers of a plurality of partial single channel grating functions, each partial single channel grating function relating to one of the updated multi-channel grating structure's channels.

16. The method of claim 13 wherein the updated relative center positions relating to each of the channels are determined with reference to the group delay of a reflection spectrum of the target multi-channel grating function in the center of the channel.

17. The method of claim 1 wherein the updated value for each of the initial values is determined by taking a weighted sum of the initial values and a corresponding spectral characteristic of the target multi-channel grating function.

18. The method of claim 1 wherein the computer processor is utilized to determine the initial value for the at least one free spectral characteristic by:
   determining an approximate multi-channel grating function which describes an approximate multi-channel grating structure which is approximately the multi-channel grating structure, the approximate multi-channel grating function representing a plurality of partial grating functions, each partial grating function describing an initial partial grating structure in the photosensitive material and representing the application of an exact spectral to spatial domain algorithm to a single channel reflection spectrum function, each single channel reflection spectrum function describing a portion of the at least one specified spectral characteristic which relates to a single channel;
   determining initial phase shifts for each of the initial partial grating functions for which optimization criteria are met, each initial phase shift being a phase shift of the initial partial grating function relative to a reference phase; and
   using the initial phase shifts as one of the initial spectral characteristics.

19. The method of claim 18, further including:
   utilizing the computer processor to determine initial position shifts for each of the initial partial grating functions for which optimization criteria are met, each initial position shift being the position of a center of the initial partial grating structure described by the initial partial grating function in the photosensitive material relative to a reference position; and
   using the initial position shifts as one of the initial spectral characteristics.

20. The method of claim 19 wherein the optimization criteria are such that a maximum refractive index variation of the approximate grating function is reduced.

21. The method of claim 1 wherein the updated multi-channel grating function which describes an updated multi-channel grating structure in the photosensitive material is determined by applying the spectral to spatial domain algorithm to the at least one specified spectral characteristic, using the at least one updated value and a predetermined out of band reflection spectrum.

22. A multi-channel grating structure which is designed according to the method of claim 1.

23. A multi-channel grating structure with a profile of refractive index variation along at least one dimension which is designed according to claim 1.

24. The method of designing a multi-channel grating structure according to claim 1, comprising the further step of:
   creating the multi-channel grating structure using the updated multi-channel grating function.

25. The method of claim 24 wherein creating the multi-channel grating structure comprises utilizing an interferometer to write a multi-channel grating into an optical fiber using the updated multi-channel grating function.

26. A method of designing a multi-channel grating structure in a photosensitive material, the grating structure having specified spectral characteristics, the method including:
   storing a plurality of partial grating functions on a machine-readable medium, each partial grating function describing a partial gating structure in the photosensitive material; and
   utilizing a computer processor to determine a multi-channel grating design function which describes the multi-channel grating structure, the design function comprising the plurality of partial grating functions;
   wherein, in said multi-channel grating design function:
   each partial grating function represents the application of an exact spectral to spatial domain algorithm to a respective single channel reflection spectrum function, each single channel reflection spectrum function describing a portion of the specified spectral characteristics which relates to a single channel;
   at least one of the partial grating functions is phase shifted by a phase shift relative to the other partial grating functions; and
   at least one of the partial grating functions has a center grating position in the photosensitive material which is shifted by a position shift relative to the other partial grating functions.

27. The method of claim 26 wherein at least one of the partial grating functions is substantially different to the other partial grating functions.

28. The method of designing a multi-channel grating structure according to claim 26, comprising the further step of creating the multi-channel grating structure using the multi-channel grating design function.

29. A method of designing a multi-channel grating structure in a photosensitive material, the grating structure having predetermined spectral characteristics, the method including:
   storing a plurality of partial gating functions on a machine-readable medium, each partial grating function describing a partial grating structure in the photosensitive material; and
   utilizing a computer processor to determine a multi-channel grating design function which describes the multi-channel grating structure, the design function comprising plurality of partial grating functions;
   wherein, in said multi-channel grating design function:
   each partial grating function represents the application of an exact spectral to spatial domain algorithm to a respective single channel reflection spectrum function, each single channel reflection spectrum function describing a portion of the predefined spectral characteristics which relates to a single channel;
   at least one of the partial grating functions is phase shifted by a phase shift relative to the other partial grating functions; and
   at least one of the partial grating functions is different to the other partial grating functions.

30. The method of designing a multi-channel grating structure according to claim 29, comprising the further step of creating the multi-channel grating structure using the multi-channel grating design function.

31. A multi-channel grating structure with a profile of refractive index variation along at least one dimension which is described by a plurality of partial grating functions in which:
- each partial grating function represents the application of an exact spectral to spatial domain algorithm to a respective single channel reflection spectrum function, each said single channel reflection spectrum function describing a portion of predefined spectral characteristics which relate to a single channel,
- at least one of the partial grating functions is phase shifted by a phase shift relative to the other partial grating functions; and
- at least one of the partial grating functions has a center grating position which is shifted by a position shift relative to the other partial grating functions,
- such that the multi-channel grating structure comprises non-identical spectral channels and/or non-equidistant channel spacing.

32. The multi-channel grating structure of claim 31 wherein at least one of the partial grating functions is substantially different to the other partial grating functions.

* * * * *